United States Patent [19]

Orzel

[11] Patent Number: 5,386,693
[45] Date of Patent: Feb. 7, 1995

[54] ENGINE AIR/FUEL CONTROL SYSTEM WITH CATALYTIC CONVERTER MONITORING

[75] Inventor: Daniel V. Orzel, Westland, Mich.
[73] Assignee: Ford Motor Company, Dearborn, Mich.
[21] Appl. No.: 127,148
[22] Filed: Sep. 27, 1993
[51] Int. Cl.$^6$ .............................................. F01N 3/20
[52] U.S. Cl. ...................................... 60/274; 60/276; 60/277; 60/285; 123/674; 123/703
[58] Field of Search ................. 60/274, 276, 285, 277; 123/672, 674, 703

[56] References Cited

U.S. PATENT DOCUMENTS

| | | | |
|---|---|---|---|
| 3,939,654 | 2/1976 | Creps | 60/276 |
| 4,130,095 | 12/1978 | Bowler et al. | |
| 4,304,204 | 12/1981 | Glöcker | 60/276 |
| 4,526,147 | 7/1985 | Grob | 123/440 |
| 4,831,838 | 5/1989 | Nagai et al. | |
| 5,115,639 | 5/1992 | Gopp | 60/274 |
| 5,207,056 | 5/1993 | Benninger | |
| 5,224,345 | 7/1993 | Schnaibel et al. | |
| 5,251,437 | 10/1993 | Furuya | |
| 5,255,512 | 10/1993 | Hamburg | 60/274 |
| 5,255,515 | 10/1993 | Blumenstock et al. | |
| 5,289,678 | 3/1994 | Grutter | |

*Primary Examiner*—Ira S. Lazarus
*Assistant Examiner*—Daniel J. O'Connor
*Attorney, Agent, or Firm*—Allan J. Lippa; Roger L. May

[57] ABSTRACT

A control system which provides air/fuel feedback control while measuring catalytic converter efficiency. An efficiency test period is provided when the count in transitions of a signal related to an upstream exhaust gas oxygen sensor reaches a maximum count for a plurality of inducted airflow ranges. During the test period, three separate ratios indicating converter efficiency are provided. These ratios include: a ratio of downstream exhaust gas oxygen sensor total amplitude to a feedback variable derived from the upstream sensor; a ratio in frequency of transitions of the downstream sensor to frequency of the feedback variable; and a ratio of areas derived from the downstream sensor and feedback variable. When all three ratios indicate degraded converter efficiency, an overall indication is provided.

10 Claims, 10 Drawing Sheets

ENGINE AIR/FUEL CONTROL SYSTEM WITH CATALYTIC CONVERTER MONITORING

FIELD OF THE INVENTION

The invention relates to controlling an engine air/fuel ratio while concurrently monitoring the efficiency of a catalytic converter coupled to an engine exhaust.

BACKGROUND OF THE INVENTION

Control systems are known for controlling engine air/fuel ratio in response to exhaust gas oxygen sensors positioned upstream and downstream of a catalytic converter. In such systems it is known to test efficiency of the catalytic converter by computing an amplitude ratio of downstream sensor to upstream sensor output and comparing the computed amplitude ratio to a reference ratio during a predetermined time period. In another known approach, a ratio of downstream to upstream switching ratios is compared to a reference ratio during a predetermined time period. For both approaches, degradation in converter efficiency is indicated when the calculated ratio falls below the reference ratio.

The inventors herein have recognized numerous problems with the approaches described above. For example, there may be an undesired variability in test results and, consequently, erroneous failure indications. Causes for such variability include: poor exhaust gas mixing; variations in vehicular operating conditions from one test period to another test period; and clipping of the sensor output during transient air/fuel operation.

SUMMARY OF THE INVENTION

An object of the invention herein is to provide monitoring of catalytic converter efficiency during engine air/fuel control with less variability in the monitoring results than heretofore possible.

The above object is achieved, and problems of prior approaches overcome, by providing both a control system and method for controlling engine air/fuel ratio and concurrently monitoring efficiency of a catalytic converter positioned in the engine exhaust. In one particular aspect of the invention, the method comprises the steps of: controlling fuel delivery to the engine in response to an output of an exhaust gas oxygen sensor positioned upstream of the catalytic converter and an output of an exhaust gas oxygen sensor positioned downstream of the catalytic converter; generating a first monitoring ratio of a first downstream signal derived from the downstream sensor output to a first upstream signal derived from the upstream sensor output; generating a second monitoring ratio of a second downstream signal derived from the downstream sensor output to a second upstream signal derived from the upstream sensor output; and indicating degradation in efficiency of the converter when at least both the first monitoring ratio and the second monitoring ratio are beyond preselected values during a test period.

Preferably the above cited method includes a step of generating a third monitoring ratio of a third downstream signal to a third upstream signal. The first downstream signal may preferably be derived from amplitude of the downstream sensor output and the first upstream signal may be derived from an integration of the upstream sensor output which may also be used as a feedback variable to control the engine's air/fuel ratio. The second downstream signal is preferably derived from frequency in transitions from the downstream sensor and the second upstream signal may be derived from frequency in transitions of the feedback variable. The third downstream signal is derived from an integration or area calculation of the downstream sensor and the third upstream signal may be derived from an integration of the feedback variable. Preferably, the test period is generated when the engine completed operation within each of plurality of inducted airflow ranges for a duration determined by a preselected count of transitions in the upstream sensor output.

An advantage of the above aspect of the invention is that variability in testing converter efficiency is significantly reduced by combining a number of test ratios and also by the particular manner in which the test ratios are determined. The variability of test results is also reduced by testing the converter when an indication is provided that the engine is operating around stoichiometry. More specifically, in the above aspect of the invention this indication is provided by counting a preselected number of transitions in the upstream sensor output. Testing of converter efficiency while the engine is operating under transient conditions, or nonstoichiometric combustion, is thereby avoided and more accurate test results consistently achieved. An additional advantage is that the catalytic converter is tested over a full range of exhaust gas flows thereby significantly reducing variability in test results obtained by previously known methods.

BRIEF DESCRIPTION OF THE DRAWINGS

The object and advantages of the invention will be more clearly understood by reading an example of an embodiment in which the invention is used to advantage with reference to the attached drawings wherein.

DESCRIPTION OF AN EMBODIMENT

Figure 1:
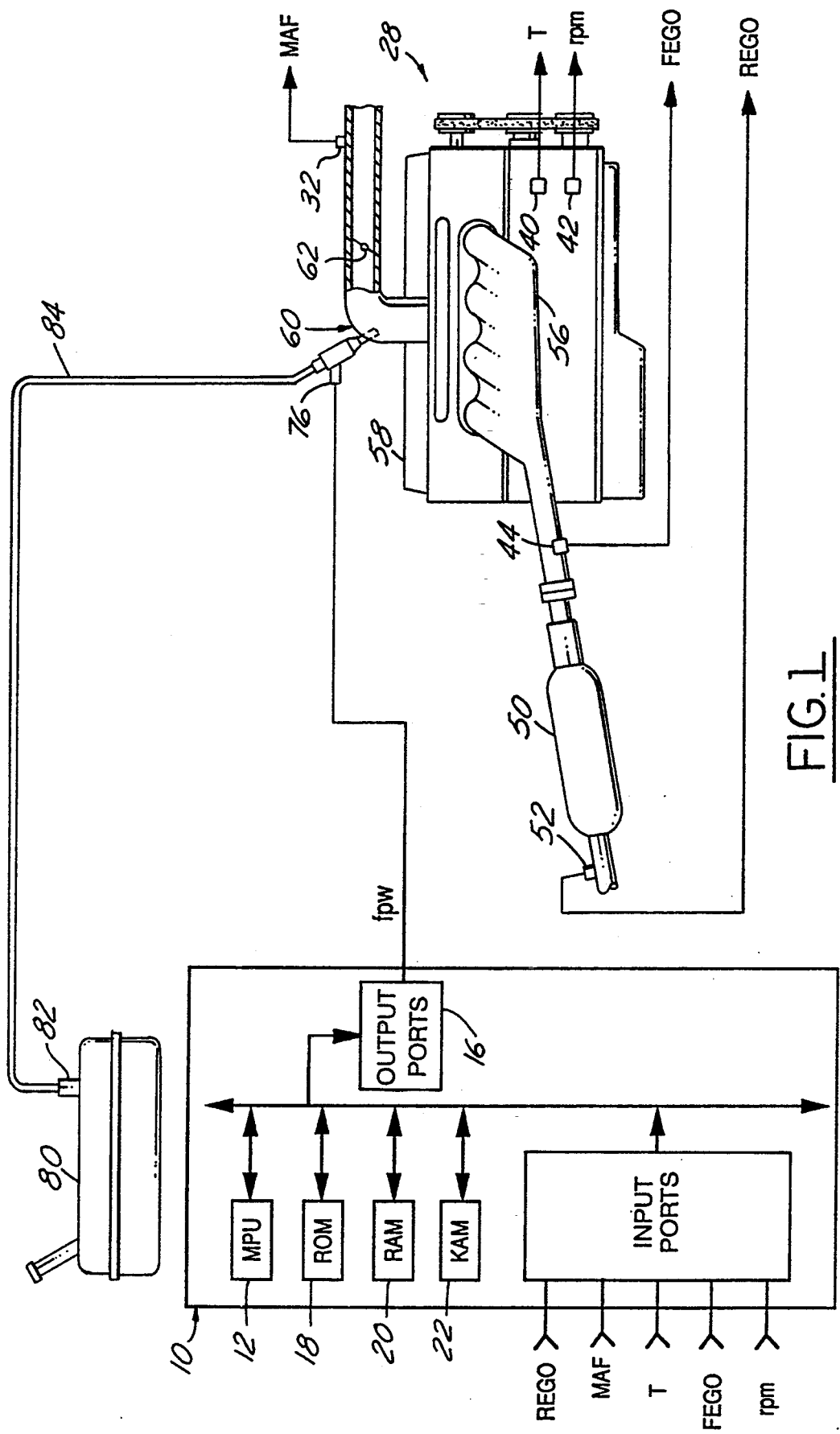
FIG. 1 is a block diagram of an embodiment wherein the invention is used to advantage.

Controller 10 is shown in the block diagram of FIG. 1 as a conventional microcomputer including: microprocessor unit 12; input ports 14; output ports 16; read-only memory 18; random access memory 20; keep-alive memory 22; and a conventional data bus. Controller 10 is shown receiving various signals from sensors coupled to engine 28 including: measurement of inducted mass airflow (MAF) from mass airflow sensor 32; engine coolant temperature (T) from temperature sensor 40; indication of engine speed (rpm) from tachometer 42; output signal FEGO from conventional exhaust gas oxygen sensor 44, positioned upstream of catalytic converter 50; and signal REGO from another conventional exhaust gas oxygen sensor (52) coupled to exhaust manifold 56 downstream of catalytic converter 52. Intake manifold 58 of engine 28 is shown coupled to throttle body 60 having primary throttle plate 62 positioned therein. Throttle body 60 is also shown having fuel injector 76 coupled thereto for delivering liquid fuel in proportion to the pulse width of signal fpw from controller 10. Fuel is delivered to fuel injector 76 by a conventional fuel system including fuel tank 80, fuel pump 82, and fuel rail 84. Other engine components and systems such as an ignition system are not shown because they are well known to those skilled in the art.

Although a central fuel injection system is shown, the invention claimed herein may be used to advantage with other types of systems such as sequential fuel injection or carbureted systems. Those skilled in the art will also recognize that the invention claimed herein is applicable to other engine control configurations such as "stereo" air/fuel control systems having exhaust gas oxygen sensors positioned in each of the exhaust manifolds for engines having a "V" configuration.

Figure 2:
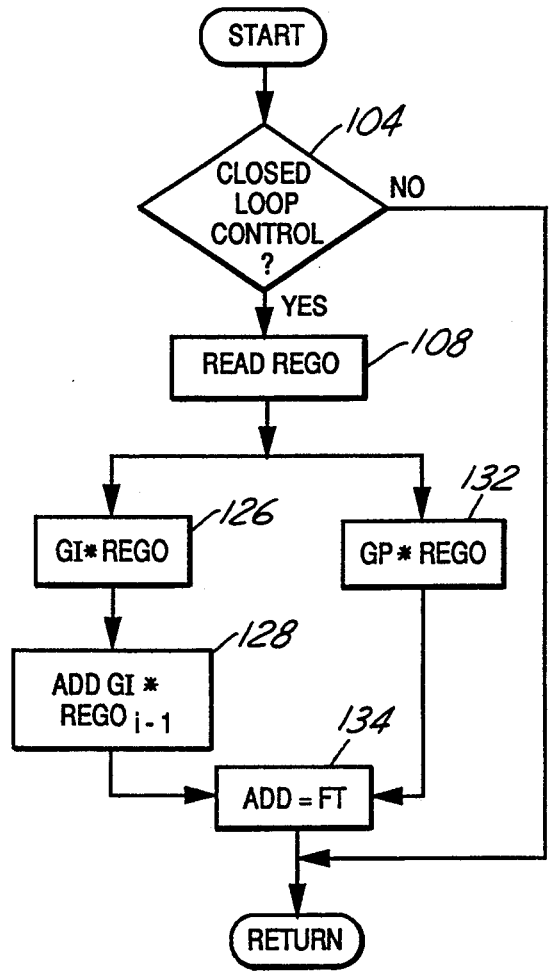
FIG. 2 is a high level flowchart of various operations performed by a portion of the embodiment shown in FIG. 1.

Referring now to FIG. 2, a flowchart of a routine performed by controller 10 to generate fuel trim signal FT is now described. In the particular example described herein, closed-loop air/fuel control is commenced (step 104) when engine temperature is within a predetermined range, the engine has been operating for at least a preselected time, and throttle position is within a preselected range. When closed-loop control commences, signal REGO is read (step 108) and subsequently processed in a proportional plus integral controller as described below.

Referring first to step 126, signal REGO is multiplied by gain constant GI and the resulting product added to products previously accumulated (GI * $REGO_{i-1}$) in step 128. Stated another way, signal REGO is integrated each sample period (i) in steps determined by gain constant GI. During step 132, signal REGO is also multiplied by proportional gain GP. The integral value from step 128 is to the proportional value from step 132 during addition step 134 to generate fuel trim signal FT.

Figure 3:
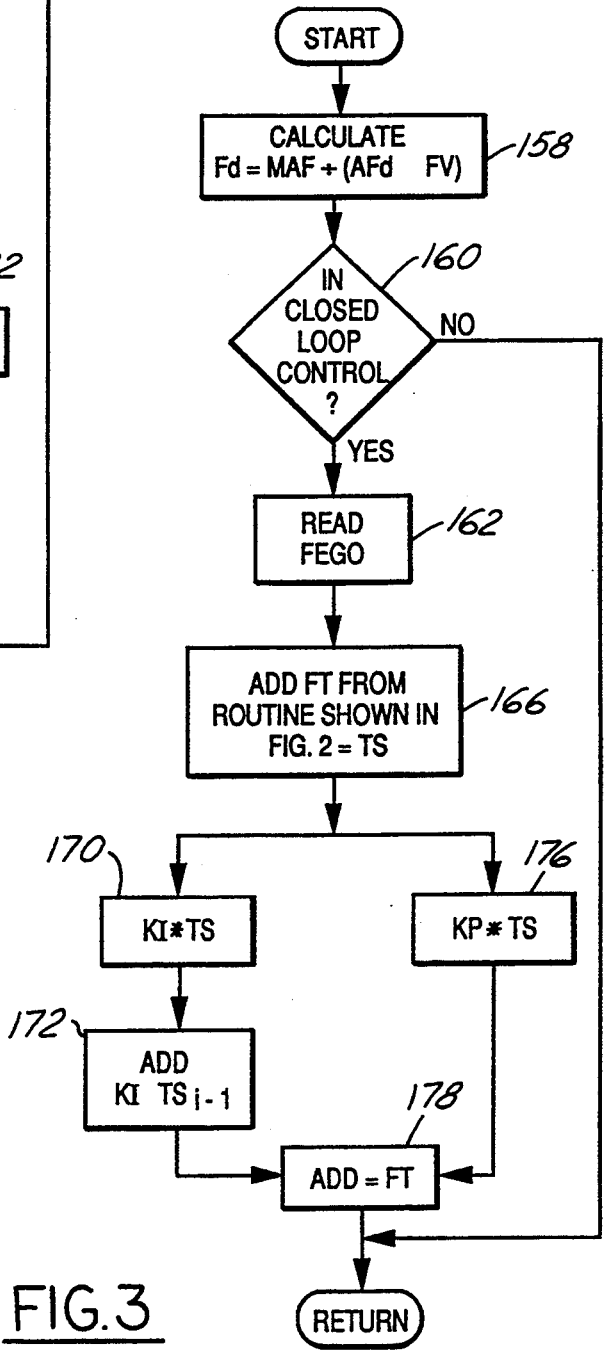
FIG. 3 is a high level flowchart of various operations performed by a portion of the embodiment shown in FIG. 1.

The routine executed by controller 10 to generate the desired quantity of liquid fuel delivered to engine 28 is now described with reference to FIG. 3. During step 158, an open-loop fuel quantity is first determined by dividing measurement of inducted mass airflow (MAF) by desired air/fuel ratio AFd which is typically the stoichiometric value for gasoline combustion. This open-loop fuel charge is then adjusted, in this example divided, by feedback variable FV which is generated as described below with respect to steps 160-178 shown in FIG. 3.

After determining that closed-loop control is desired (step 160), by monitoring engine operating conditions such as those previously described herein with reference to step 104 in FIG. 2, signal FEGO is read during step 162. Signal FEGO is then trimmed (in this example by addition) with trim signal FT which is transferred from the routine previously described with reference to FIG. 2 to generate trimmed signal TS. The product of integral gain value KI times trimmed signal TS (step 170) is generated and added to the previously accumulated products (step 172). That is, trimmed signal TS is integrated in steps determined by gain constant KI each sample period (i) during step 172. A product of proportional gain KP times trimmed signal TS (step 176) is then added to the integration of KI * TS during step 178 to generate feedback variable FV.

Alternatively, the process described above with particular reference to FIG. 3 may be performed by biasing signal FV, rather than trimming signal FEGO, with fuel trim signal FT. In one such alternative embodiment, two proportional gain constants ($KP_1$ and $KP_2$) are used to advantage. Proportional gain $KP_1$ multiplies signal FEGO when it switches from a lean to a rich indicating state and proportional gain $KP_2$ multiplies signal FEGO when it from a rich to a lean indicating state. Proportional term $KP_1$ is incremented when fuel trim signal FT indicates a lean bias is desired and proportional term $KP_1$ is decreased (or $KP_2$ incremented) when a rich bias is desired by fuel trim signal FT.

Figure 4A:
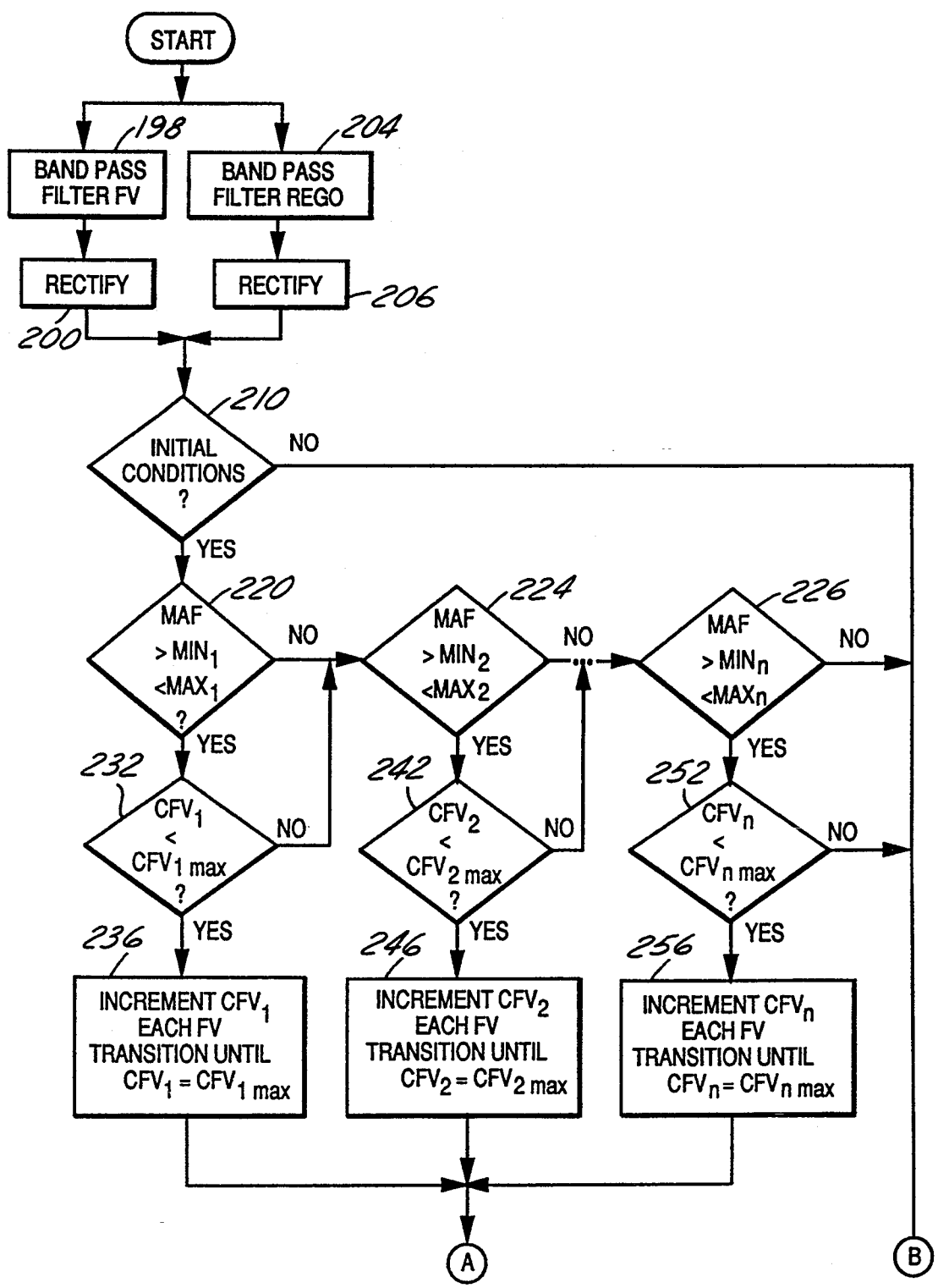
FIGS. 4A-4B are a high level flowchart of various operations performed by a portion of the embodiment shown in FIG. 1.
Figure 4B:
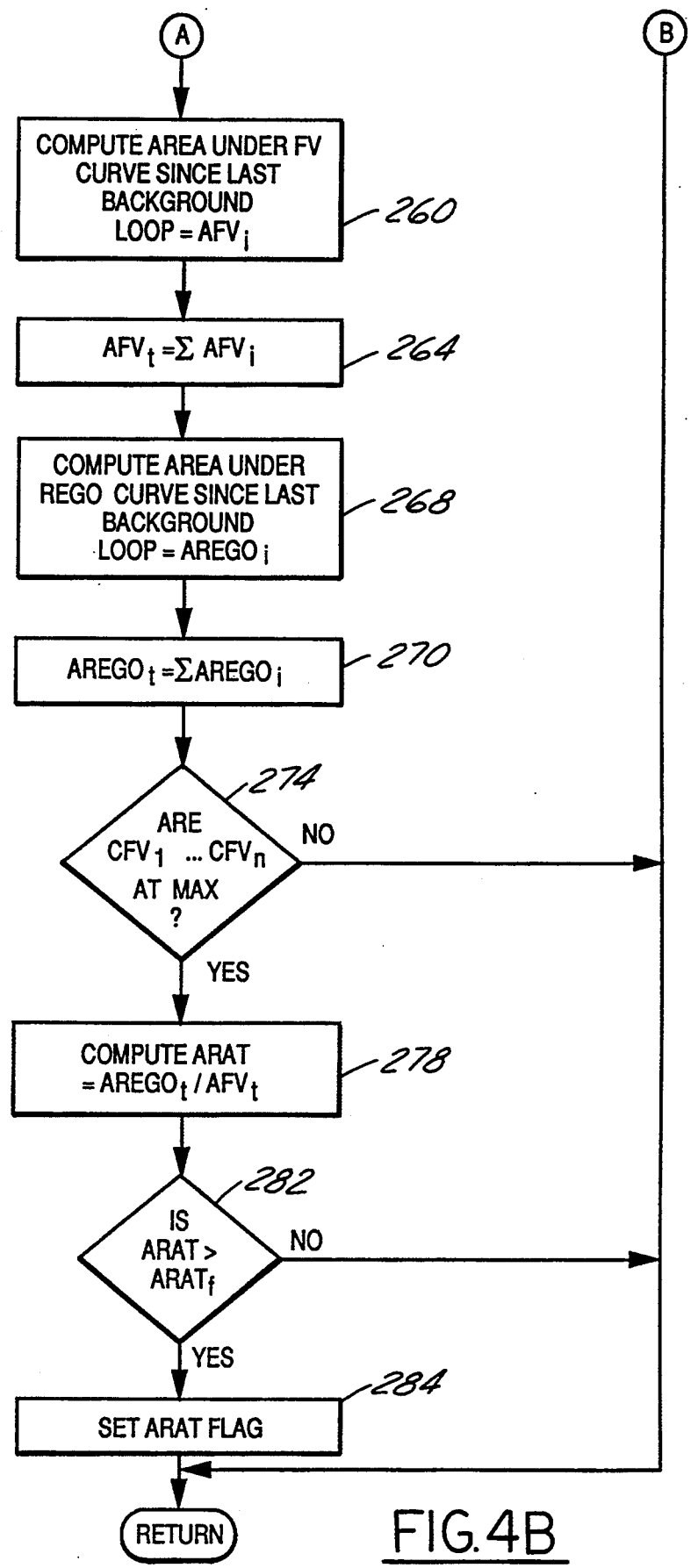

The first of three examples for providing an indication of converter efficiency is now described with particular reference to the flowchart shown in FIGS. 4A-4B. During step 198 and step 200, signal FV is band pass filtered and then rectified. A graphical representation of signal FV during typical engine operation is show in FIG. 5A and its filtered output shown in FIG. 5B (before rectification). Similarly, signal REGO is band pass filtered, and the filtered output rectified (see steps 204 and 206 in FIG. 4A). A graphical representation of signal REGO during typical engine operation is shown in FIG. 6A, and the signal output after band pass filtering is shown in FIG. 6B (before rectification). It is noted that the band pass filter operation facilitates the subsequent operation of computing area under the signal curves (i.e., integration).

Continuing with FIGS. 4A-4B, initial engine conditions are checked during step 210 before entering the test cycle described below. More specifically, the test cycle is entered when engine temperature (T) is within a predetermined range, a predetermined time elapsed since the engine was started, and the closed loop air/fuel control has been operable for a preselected time.

During steps 220, 224, and 226, the inducted air flow range in which engine 28 is operating is determined. These ranges are described as range (1), range (2) . . . , and range (n), for this example wherein "n" inducted air flow ranges are used to advantage. Assuming engine 28 is operating within air flow range (1), the transition between states of signal FV are counted to generate count signal $CFV_1$. While engine operation remains within air flow range (1), count $CFV_1$ is incremental each transition of signal FV until count $CFV_1$ is equal to maximum count $CFV_{1max}$ (steps 232 and 236).

The above described operation occurs for each air flow range. For example, when engine 28 is operating within air flow range (n), as shown in step 226, count $CFV_n$ is incremental each transition in signal FV until it reaches maximum count $CFV_{nmax}$ (steps 252 and 256). As described below with particular reference to step 274, a converter test cycle is completed when engine 28 has operated in each of "n" airflow ranges for a period determined by a preselected number of signal FV transitions in each of the airflow ranges.

During each background loop of controller 10, the area under the curve formed by signal FV (after it is band pass filtered and rectified) is computed since the last background loop. This partial area is shown as signal $AFV_i$ in step 260. Signal $AFV_i$ is added to the areas accumulated during previous background loops to generate total area $AFV_t$ (step 264).

Proceeding in a similar manner to that described above with respect to the generation of total area $AFV_t$, the area under the curve formed by signal REGO (after it is band pass filtered and rectified) is computed during steps 268 and 270. More specifically, during each background loop of controller 10, the area under the REGO curve is computed during the present background loop (step 268) and added to the previously accumulated areas to generate total area $AREGO_t$ (step 270).

Those skilled in the art will recognize that the above described operations of computing area under a curve defined by either signal FV or signal REGO, may be performed by integrating respective signal FV or signal REGO. Each area computation of signal $AFV_i$ or signal $AREGO_i$ is similar to an integration step during each background loop.

During step 274, a determination is made that the test cycle or period has been completed when the count in transitions of feedback variable FV for each airflow range ($CFV_1 \ldots CFV_n$) has reached its respective maximum value (MAX). After the test cycle has been completed, area ratio ARAT is computed by dividing the total area under the feedback variable curve ($AFV_t$) into the area under the REGO curve ($AREGO_t$) during step 278. Variables $CFV_1 \ldots CFV_n$, $AFV_t$, and $AREGO_t$ are also reset (step 280). When computed area ratio ARAT is greater than reference or predetermined area ratio $ARAT_f$, as shown in step 282, area ratio flag ARAT is set (step 284).

Figure 5A:
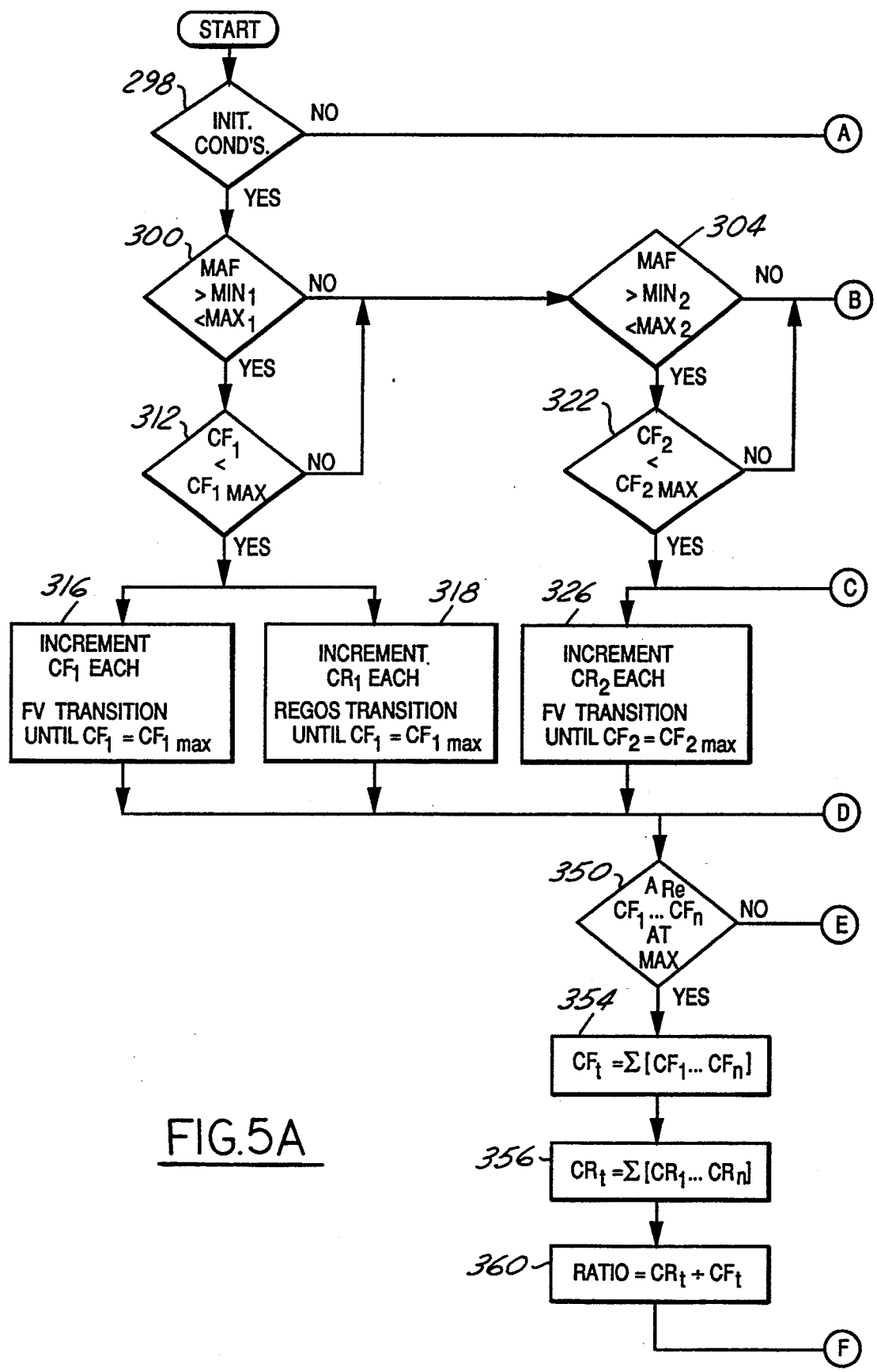
FIGS. 5A-5B are a high level flowchart of various operations performed by a portion of the embodiment shown in FIG. 1.
Figure 5B:
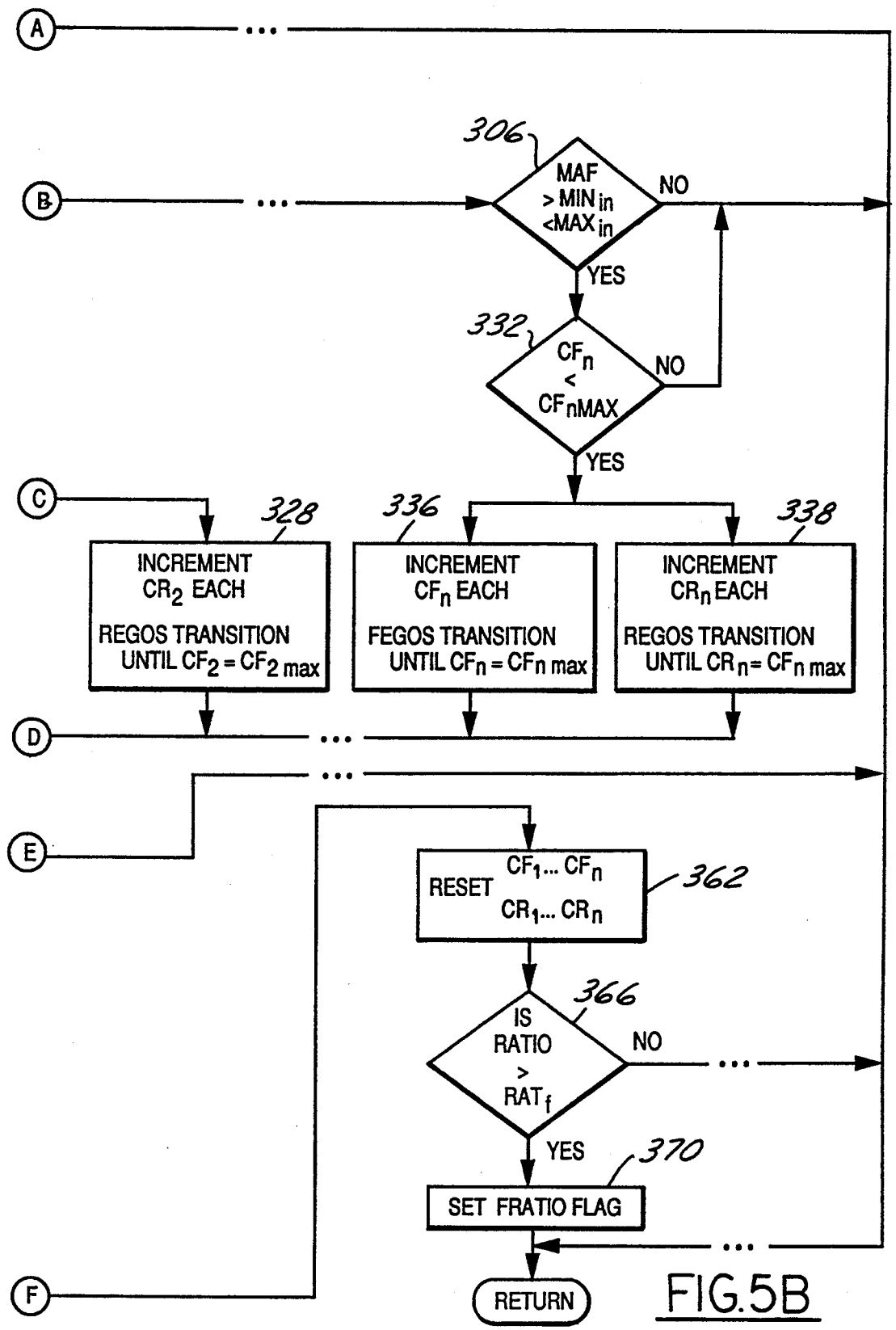
Figure 6A:
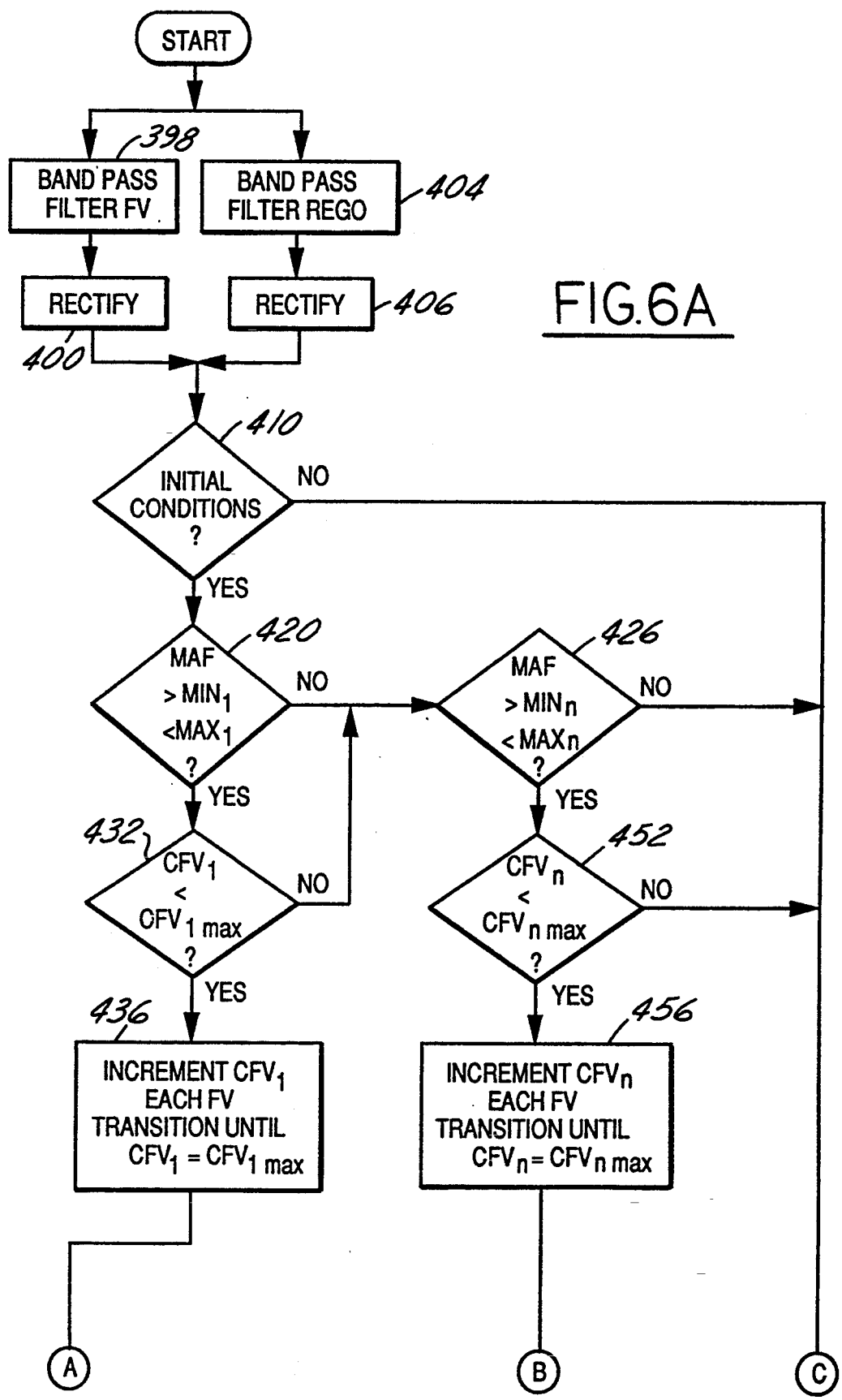
FIGS. 6A-6B are a high level flowchart of various operations performed by a portion of the embodiment shown in FIG. 1.
Figure 6B:
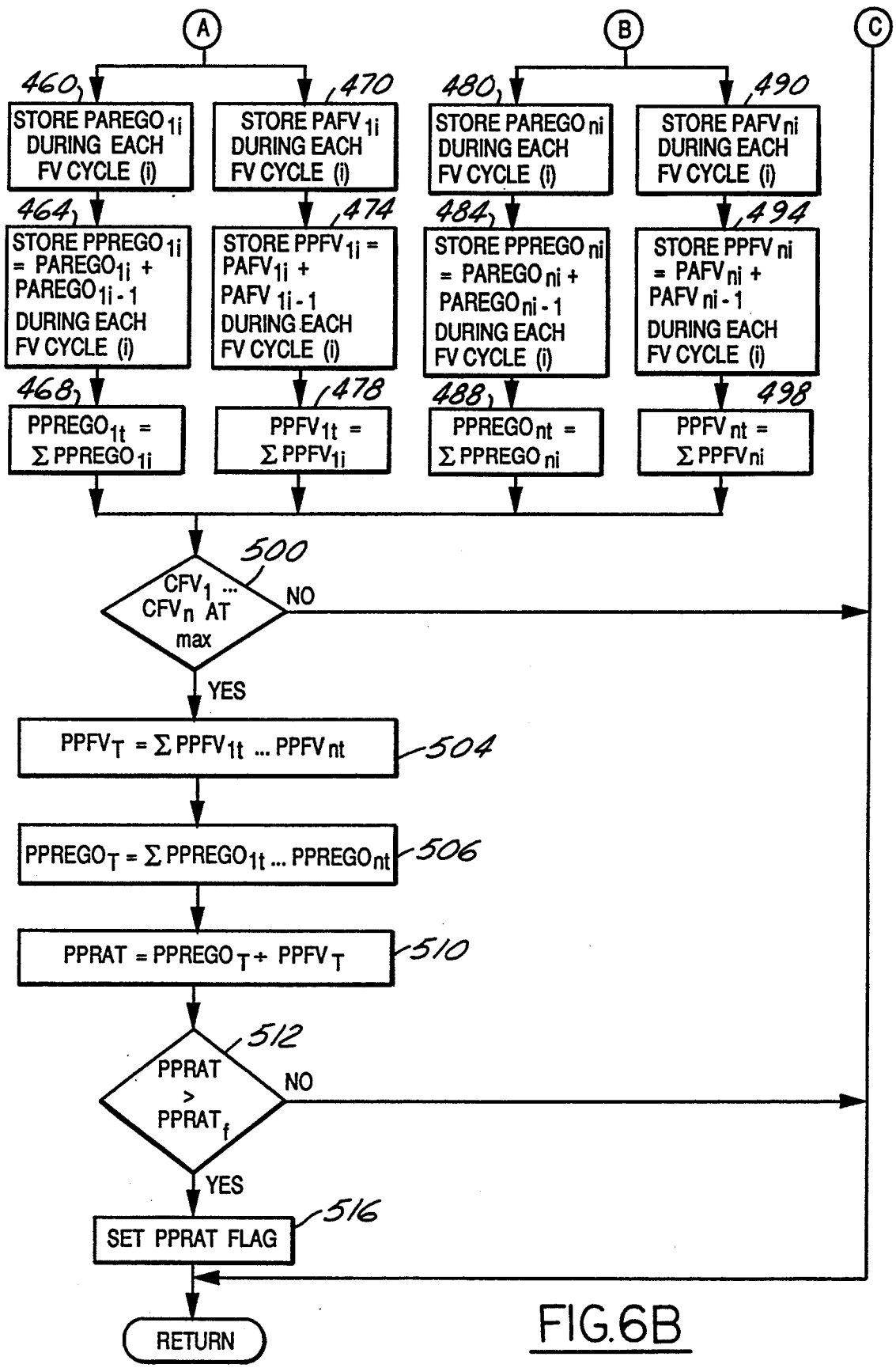
Figure 7A:
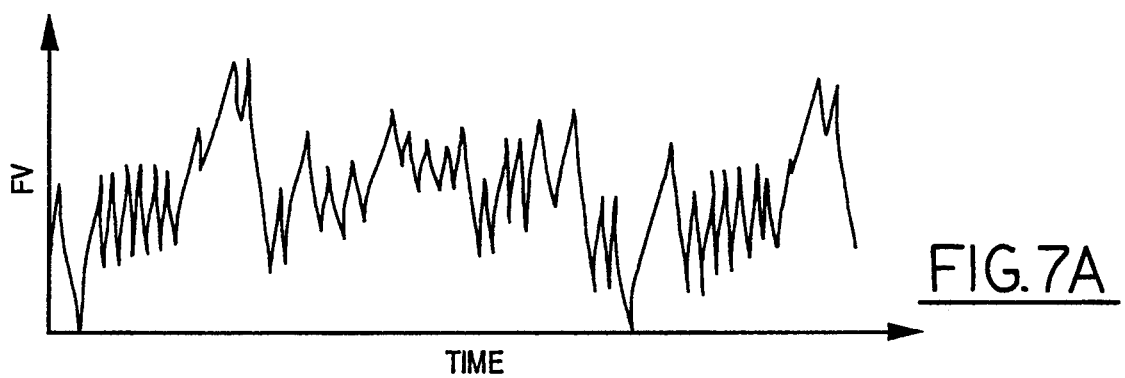
FIGS. 7A-7B are graphical representations of various electrical signals generated by the embodiment shown in FIG. 1.
Figure 7B:
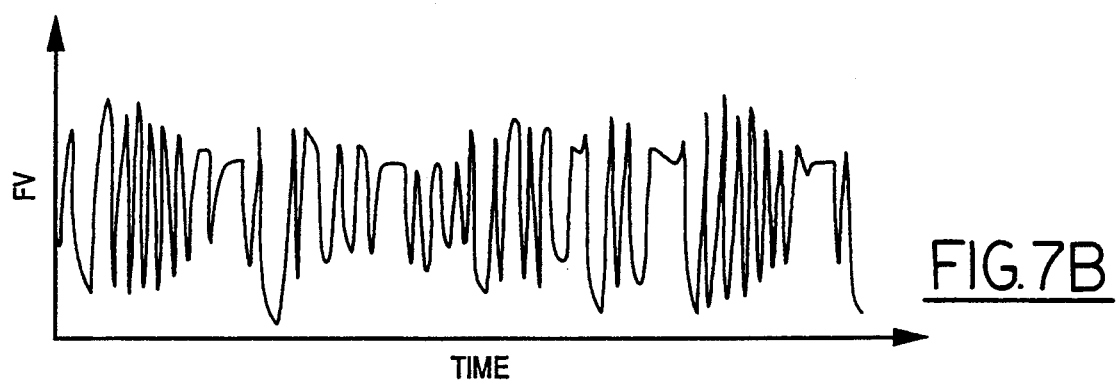
Figure 8A:
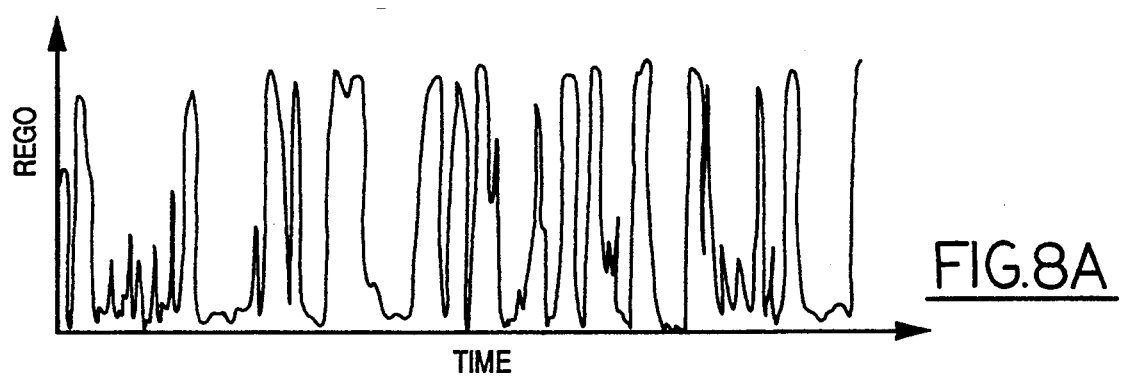
FIGS. 8A-8B are graphical representations of various electrical signals generated by the embodiment shown in FIG. 1.
Figure 8B:
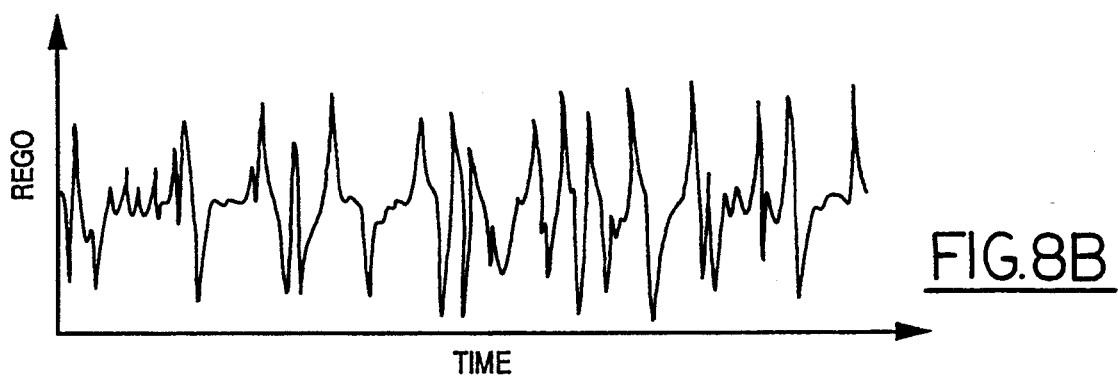

The second of three examples presented herein for providing an indication of converter efficiency is now described with particular reference to the flowchart shown in FIGS. 5A–5B. During step 298, initial engine conditions are checked (see step 210 in FIG. 4A) before entering the test cycle described below. The inducted airflow range in which engine 28 operating is then determined during steps 300, 304, and 306. These ranges are described as range (1), range (2), and range (n) for this example wherein "n" inducted airflow ranges are used to advantage.

Assuming engine operation is within airflow range (1), transitions between states of signal FEGO are counted to generate count signal $CF_1$. This count is compared to maximum count $CF_{1max}$ during step 312. While engine operation remains within airflow range (1), count $CF_1$ is incremented each transition of signal FEGO until count $CF_1$ is equal to maximum count $CF_{1max}$ (step 316). Similarly, count $CR_1$ is incremented each transition of signal REGO until count $CF_1 = CF_{1max}$.

The above described operation occurs for each airflow range. For example, when engine 28 is operating within airflow range (n) as shown in step 306, test period count $CF_n$, and count $CR_n$ are generated as shown in steps 332, 336, and 338.

During step 350, a determination is made as to whether engine 28 has operated in all airflow ranges (i ... n) for the required minimum duration or test period. Stated another way, step 350 determines when each count of transitions in signal FEGOS ($CF_1$, $CF_2$, ... $CF_n$) have reached their respective maximum values ($CF_{1max}$, $CF_{2max}$, ... $CF_{nmax}$). Each count ($CF_{1max}$ ... $CF_{nmax}$) of transitions in signal FEGOS is then summed in step 354 to generate total count $CF_t$.

Total count $CR_t$ is generated in step 356 by summing each count ($CR_1 \ldots CR_n$) for each airflow range during the test period. A ratio of total count $CR_t$ to total count $CF_t$ is then calculated during step 360 and all counts subsequently reset in step 362. If the calculated ratio is greater than a preselected reference ratio ($RAT_f$) a frequency ratio flag is set (steps 366 and 370) indicating that converter efficiency has degraded below a preselected limit.

Referring now to FIGS. 6A–6B, an additional indication of converter efficiency is now described wherein peak-to-peak amplitude ratio of signal REGO is compared to peak-to-peak amplitude of signal FV. Steps 398–456 are processed in a manner similar to that previously described herein with respect to corresponding steps 198–256 shown in FIGS. 4A–4B.

During step 398 and step 400, signal FV is band pass filtered and then rectified. Similarly, signal REGO is band pass filtered, and the filtered output rectified (see steps 404 and 406 in FIG. 6A). Initial engine conditions are checked during step 410 before entering the test cycle described below.

The inducted airflow range in which engine 28 is operating is determined during steps 420, 424, and 426. When engine 28 is operating within airflow range (1), the transition between states of signal FV are counted to generate count signal $CFV_1$. Each transition of signal FV, count $CFV_1$ is incremented until it reaches its maximum count $CFV_{1max}$ (steps 432 and 436). The same procedure is followed when engine 28 is operating within airflow range (n) as shown in steps 426, 452, and 456. This portion of the converter test cycle or period is completed when engine 28 has operated in each of "n" airflow ranges during a preselected number of transitions in signal FV. A similar result may also be achieved by counting transitions in signal FEGO in place of transitions in signal FV.

While engine 28 is operating in airflow range (1), peak amplitude $PARGO_{1i}$ of signal REGO is stored during each cycle (i) of signal FV in step 460. During step 464, peak-to-peak signal $PPREGO_{1i}$ is calculated by adding peak amplitude $PARGO_{1i}$ during the present (i) cycle to the peak amplitude during the previous (i−1) cycle. Total peak amplitude $PPREGO_{1t}$ for airflow range (1) is calculated by adding peak-to-peak amplitude $PPREGO_{1i}$ from each FV cycle.

Continuing with the example presented for airflow range (1), peak amplitude $PAFV_{1i}$ of feedback variable FV is stored during each cycle (i) of signal FV. Peak-to-peak amplitude $PPFV_{1i}$ is calculated in step 474 by adding peak amplitude $PAFV_{1i}$ during each signal FV cycle (i) to peak amplitude $PAFV_{1i-1}$ from the previous (i−1) cycle of signal FV. Total peak-to-peak amplitude $PPFV_{1t}$ of signal FV while engine 28 is operating in airflow range (1) is calculated in step 478 by adding peak-to-peak amplitude $PPFV_{1i}$ for each cycle (i) of signal FV.

Total peak-to-peak amplitude $PPREGO_{nt}$ of signal REGO while engine 28 is operating in airflow range (n) is calculated during steps 480, 484, and 488 in a manner substantially the same as previously described herein with respect to corresponding steps 460, 464, and 468. Similarly, peak-to-peak signal $PPFV_{nt}$ is calculated during steps 490, 492, and 498 in a manner substantially the same as previously described herein with respect to corresponding steps 470, 474, and 478.

The test cycle for the example presented in FIGS. 6A-6B is completed when the count in transitions of signal FV for each airflow range ($CFV_1 \ldots CFV_n$) reaches its respective maximum value (step 500). After completion of this test period or cycle, the total peak-to-peak amplitude of signal FV ($PPFV_T$) is calculated in step 504 by summing the total peak-to-peak amplitude of signal FV for each of the airflow ranges. Similarly, the total peak-to-peak amplitude of signal REGO over this test period is calculated in step 506. During step 510, a ratio of peak-to-peak amplitudes (PPRAT) is calculated by dividing total peak-to-peak amplitude of signal FV into total peak-to-peak amplitude of signal REGO after completion of the test period. When peak-to-peak ratio PPRAT is greater than reference ratio $PPRAT_F$ (step 512), the peak-to-peak ratio flag is set in step 516.

Figure 9:
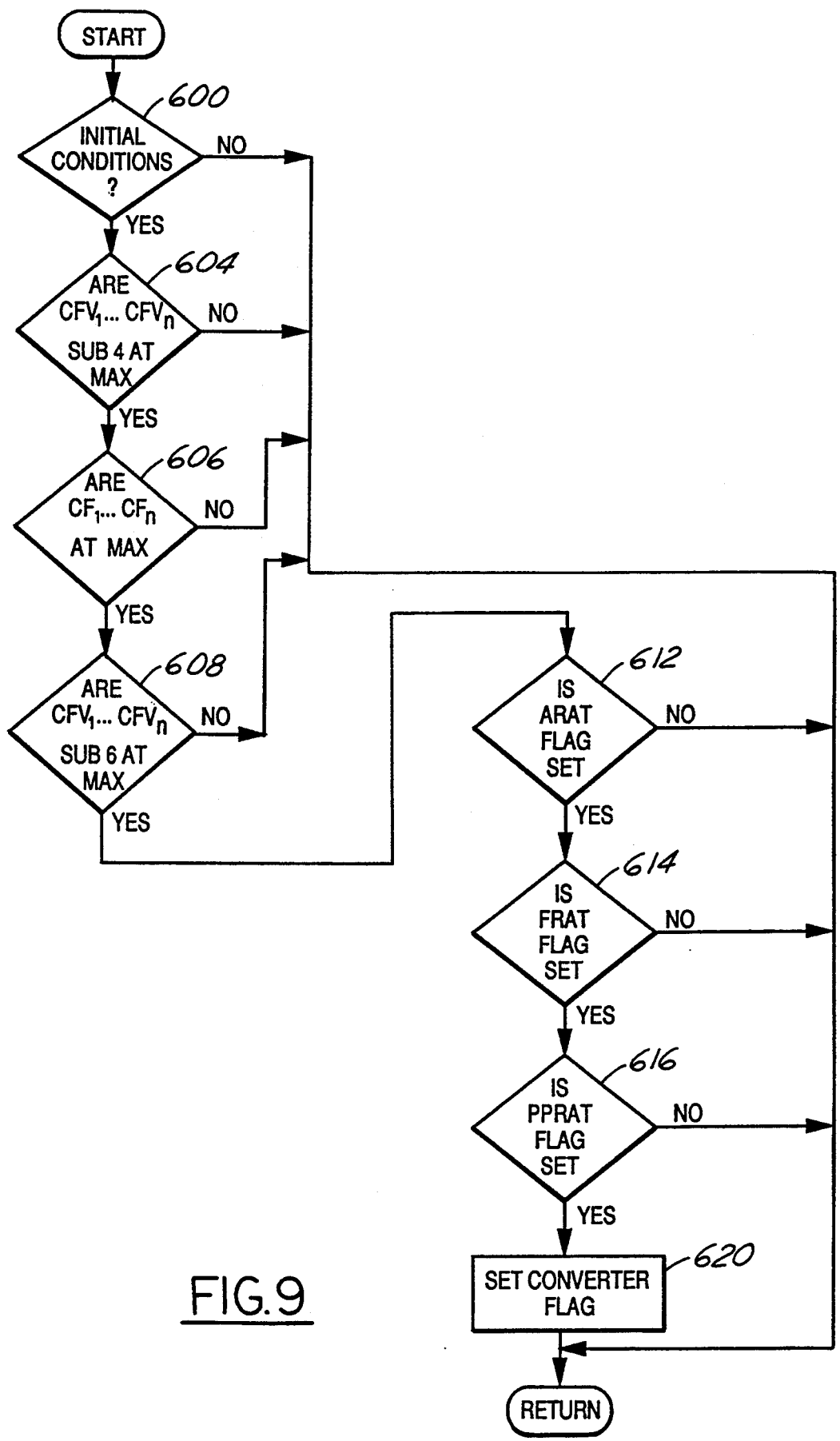
FIG. 9 is a high level flowchart of various operations performed by a portion of the embodiment shown in FIG. 1.

Referring now to FIG. 9, the indications of converter efficiency provided by each of the routines described in FIGS. 4A-4B, 5A-5B, and 6A-6B are combined. Initial conditions are first checked in step 600 in a manner similar to that described in step 210 of FIG. 4A. The test cycle or period for determining converter efficiency is then determined when the test cycle or period for each of the routines described in FIGS. 4A-4B, 5A-5B, and 6A-6B are completed (steps 604-608). For example, the test period for the routine described in FIGS. 4A-4B (SUB 4) is completed when the count in transitions of signal FV has reached its respective maximum value for each of the airflow ranges (step 604).

After the test period for converter efficiency is indicated, the efficiency flags for each of the routines described in FIGS. 4A-4B, 5A-5B, and 6A-6B are checked. When area ratio flag ARAT (step 612), frequency ratio flag FRAT (step 614), and peak-to-peak ratio flag PPRAT (step 616) are all set, the overall converter efficiency flag is set (step 620) indicating degraded converter efficiency. By requiring all three ratios to exceed preselected values, test variability is reduced.

It is noted that the test periods for each of the routines may be selected at different values to further minimize variability in converter efficiency over the entire test period. For example, $CFV_1$ for the subroutine described in FIGS. 4A-4B, may be selected at a different value than $CFV_1$ for the subroutine described with respect to FIGS. 6A-6B. Further, the test duration during each airflow range (1 ... n) may be selected at values to optimize test results. For example, $CFV_1$ may be selected at a different value than $CFV_n$. In addition, although the two state upstream and downstream exhaust gas oxygen sensors were used in the above example, the invention claimed herein may be used to advantage with other sensors such as proportional sensors. Other modifications will become apparent to those skilled in the art without departing from the spirit and scope of the invention. Accordingly, it is intended that the invention be limited only by the following claims.

What is claimed:

1. A method for controlling engine air/fuel ratio and concurrently monitoring efficiency of a catalytic converter positioned in the engine exhaust, comprising the steps of:
    integrating an output of an exhaust gas oxygen sensor positioned upstream of the catalytic converter to generate a feedback variable;
    controlling fuel delivery to the engine in response to at least said feedback variable;
    generating a first monitoring ratio related to a ratio of frequency of transitions in said feedback variable to frequency in transitions of an output from an exhaust gas oxygen sensor positioned downstream of the catalytic converter during a test period;
    generating a second monitoring ratio related to a ratio of amplitude of said feedback variable to amplitude of said downstream exhaust gas oxygen sensor output during said test period; and
    indicating degradation in efficiency of the converter when at least both first monitoring ratio and said second monitoring ratio are beyond preselected values during said test period.

2. The method recited in claim 1 further comprising a step of generating a third monitoring ratio related to a ratio of an integration of said feedback variable to an integration of said downstream exhaust gas oxygen sensor output during said test period and wherein said indicating step is also responsive to said third monitoring signal.

3. The method recited in claim 1 further comprising a step of providing said test period by determining when the engine has completed operation within each of a plurality of inducted airflow ranges for at least a minimum duration in each of said airflow ranges.

4. The method recited in claim 1 further comprising a step of band pass filtering said feedback variable.

5. The method recited in claim 1 further comprising a step of band pass filtering said downstream exhaust gas sensor output.

6. A system for controlling engine air/fuel ratio and indicating efficiency of a catalytic converter positioned in the engine exhaust, comprising;
    control means for controlling fuel delivered to the engine in response to a feedback variable derived by integrating an output of an exhaust gas oxygen sensor positioned upstream of the converter;
    area calculating means for calculating a ratio of area under a curve defined by an output from an exhaust gas oxygen sensor positioned downstream of the converter to area under a curve defined by said feedback variable during a test period;
    amplitude calculating means for calculating a ratio of amplitude of said feedback variable to amplitude of said downstream exhaust gas oxygen sensor output during said test period;
    generating a first monitoring ratio related to a ratio of frequency of transitions in said feedback variable to frequency in transitions of said downstream exhaust gas oxygen sensor output during said test period; and
    indicator means for indicating degraded converter efficiency when said area ratio and said amplitude ratio and said frequency ratio are beyond respective preselected values.

7. The system recited in claim 6 further comprising test means for generating said test period when the engine has completed operation within each of a plurality of inducted airflow ranges for at least a predetermined duration in each of said airflow ranges.

8. The system recited in claim 6 further comprising first filter means for band pass filtering said feedback variable and second filter means for band pass filtering said downstream exhaust gas oxygen sensor output.

9. The system recited in claim 6 wherein said control means further includes trim means for trimming said feedback variable in response to an integration of said downstream sensor output.

10. The system recited in claim 6 wherein said test means determines operation within a particular airflow range by comparing inducted airflow to a preselected minimum value and a preselected maximum value so that converter efficiency is determined over a range of exhaust gas flows.

* * * * *

UNITED STATES PATENT AND TRADEMARK OFFICE
CERTIFICATE OF CORRECTION

PATENT NO. : 5,386,693

DATED : February 7, 1995

INVENTOR(S) : Daniel V. Orzel

It is certified that error appears in the above-identified patent and that said Letters Patent is hereby corrected as shown below:

At column 4, line 29, cancel "5A" and replace with --7A--.
At column 4, line 30, cancel "5B" and replace with --7B--.
At column 4, line 34, cancel "6A" and replace with --8A--.
At column 4, line 35, cancel "6B" and replace with --8B--.

Signed and Sealed this

Thirtieth Day of May, 1995

Attest:

BRUCE LEHMAN

*Attesting Officer*  *Commissioner of Patents and Trademarks*